(12) United States Patent
Cadet (10) Patent No.: US 11,892,942 B2
(45) Date of Patent: Feb. 6, 2024

(54) METHODS AND SYSTEMS FOR EXECUTING AND EVALUATING SANDBOXED FINANCIAL SERVICES TECHNOLOGY SOLUTIONS WITHIN A REGULATORY APPROVAL PROCESS

(71) Applicant: Carmelle Perpetuelle Maritza Racine Cadet, New York, NY (US)

(72) Inventor: Carmelle Perpetuelle Maritza Racine Cadet, New York, NY (US)

(73) Assignee: Emtech Solutions, Inc., New York, NY (US)

( * ) Notice: Subject to any disclaimer, the term of this patent is extended or adjusted under 35 U.S.C. 154(b) by 377 days.

(21) Appl. No.: 17/152,200

(22) Filed: Jan. 19, 2021

(65) Prior Publication Data
US 2021/0232496 A1    Jul. 29, 2021

Related U.S. Application Data

(60) Provisional application No. 62/966,184, filed on Jan. 27, 2020.

(51) Int. Cl.
*G06F 11/00* (2006.01)
*G06F 11/36* (2006.01)
(Continued)

(52) U.S. Cl.
CPC .......... *G06F 11/3688* (2013.01); *G06F 9/547* (2013.01); *G06F 21/53* (2013.01);
(Continued)

(58) Field of Classification Search
CPC ...... G06F 11/3688; G06F 9/547; G06F 21/53; G06Q 10/06395; G06Q 40/02; G06Q 50/26
See application file for complete search history.

(56) References Cited

U.S. PATENT DOCUMENTS 8,881,109 B1    11/2014    Bridges, Sr.
9,760,877 B1    9/2017    Daniel
(Continued)

FOREIGN PATENT DOCUMENTS

EP    3576033 A1    12/2019
WO    2018226868 A1    12/2018
(Continued)

OTHER PUBLICATIONS

"A journey through the FCA regulatory sandbox: The benefits, challenges, and next steps," Deloitte Centre's FinTech Team, 12 pages. Available online at < https://www2.deloitte.com/content/dam/Deloitte/uk/Documents/financial-services/deloitte-uk-fca-regulatory-sandbox-project-innovate-finance-journey.pdf>.
(Continued)

*Primary Examiner* — Joshua P Lottich
(74) *Attorney, Agent, or Firm* — Blueshift IP; Cynthia Gilbert (57) ABSTRACT

A method for executing and evaluating financial services technology solutions in a secured testing environment during a regulatory approval process includes receiving, by a first computing device, via a user interface, a regulatory process application from a second computing device. The first computing device receives an application programming interface call providing an instruction for use in executing, within a secured testing environment, a software application identified within the regulatory process application. The first computing device executes the software application within the secured testing environment. The first computing device provides access to the software application executing within the secured testing environment to a user of a third computing device, during at least one phase of a regulatory approval process. The first computing device receives a result of the at least one phase of the regulatory approval
(Continued)

process. The first computing device displays to the second computing device, the received result.

8 Claims, 9 Drawing Sheets

(51) Int. Cl.
    *G06Q 40/02*     (2023.01)
    *G06Q 50/26*     (2012.01)
    *G06F 21/53*     (2013.01)
    *G06F 9/54*     (2006.01)
    *G06Q 30/018*     (2023.01)

(52) U.S. Cl.
    CPC ........... *G06Q 30/018* (2013.01); *G06Q 40/02* (2013.01); *G06Q 50/26* (2013.01); *G06F 2221/033* (2013.01)

(56) References Cited

U.S. PATENT DOCUMENTS

| | | | | |
|---|---|---|---|---|
| 10,318,413 | B1* | 6/2019 | Wilson | G06F 11/3688 |
| 10,581,855 | B1* | 3/2020 | Donovan | G06F 3/0488 |
| 10,878,409 | B1 | 12/2020 | Chheda | |
| 11,068,885 | B2 | 7/2021 | Robins | |
| 11,403,210 | B1* | 8/2022 | McCabe | G06F 8/65 |
| 2012/0310692 | A1 | 12/2012 | Maiya | |
| 2013/0041806 | A1* | 2/2013 | Levy | G06Q 40/02 705/38 |
| 2014/0250427 | A1 | 9/2014 | Wong | |
| 2016/0011952 | A1 | 1/2016 | Tejerina | |
| 2016/0306982 | A1 | 10/2016 | Seger, II | |
| 2017/0032458 | A1* | 2/2017 | Dembo | G06Q 40/02 |
| 2017/0221052 | A1 | 8/2017 | Sheng | |
| 2018/0075532 | A1 | 3/2018 | Chenard | |
| 2018/0268382 | A1 | 9/2018 | Wasserman | |
| 2018/0285837 | A1 | 10/2018 | Wu | |
| 2019/0020665 | A1 | 1/2019 | Surcouf | |
| 2019/0080407 | A1 | 3/2019 | Molinari | |
| 2019/0228468 | A1 | 7/2019 | Hu | |
| 2019/0266668 | A1* | 8/2019 | Vail | G06Q 30/018 |
| 2019/0272590 | A1* | 9/2019 | Marusic | G06Q 40/00 |
| 2019/0333051 | A1 | 10/2019 | Brogger | |
| 2020/0005290 | A1 | 1/2020 | Madisetti | |
| 2020/0151682 | A1 | 5/2020 | Hurry | |
| 2020/0286164 | A1 | 9/2020 | Kade | |
| 2020/0410583 | A1* | 12/2020 | Hart | G06Q 20/405 |
| 2021/0073290 | A1 | 3/2021 | Hunter | |
| 2021/0209684 | A1 | 7/2021 | Foote | |
| 2021/0232496 | A1 | 7/2021 | Cadet | |
| 2021/0233170 | A1 | 7/2021 | Cadet | |
| 2021/0266167 | A1 | 8/2021 | Lohe | |
| 2021/0304193 | A1 | 9/2021 | Cadet | |

FOREIGN PATENT DOCUMENTS

| | | |
|---|---|---|
| WO | 2019236482 A1 | 12/2019 |
| WO | 2020014551 A1 | 1/2020 |
| WO | 2021150832 A1 | 7/2021 |
| WO | 2021154536 A1 | 8/2021 |
| WO | 2021195357 A1 | 9/2021 |

OTHER PUBLICATIONS

"Overview of Regulatory Sandbox," Monetary Authority of Singapore, last updated Aug. 7, 2019, 2 pages. Available online at <https://www.mas.gov.sg/development/fintech/regulatory-sandbox>.

Jason Brett, "Visa Applies for Digital Dollar Blockchain Patent," Forbes.com published online May 14, 2020, 4 pages. Available at URL: <<https://www.forbes.com/sites/jasonbrett/2020/05/14/visa-submits-patent-application-for-digital-dollar-using-blockchain/?sh=3dfe46e45b63>>.

Kevin Helms, "Visa Files Patent for Cryptocurrency System to Replace Cash," bitcoin.com published online May 15, 2020, 9 pages. Available at URL: <<https://news.bitcoin.com/visa-cryptocurrency-system/>>.

Trevor Dryer, "It's Time for a Federal Fintech Sandbox," Forbes Finance Council, Dec. 6, 2019, 5 pages. Available online at <https://www.forbes.com/sites/forbesfinancecouncil/2019/12/06/its-time-for-a-federal-fintech-sandbox/#c0350766e1ee>.

U.S. Appl. No. 17/155,428, filed Jan. 22, 2021.

U.S. Appl. No. 17/212,382, filed Mar. 25, 2021.

International Search Report & Written Opinion dated May 18, 2021, in international patent application No. PCT/US2021/014530, 11 pages.

International Search Report & Written Opinion dated May 6, 2021, in international patent application No. PCT/US2021/013927, 6 pages.

International Search Report and Written Opinion dated Jul. 20, 2021, in International Patent Application No. PCT/US2021/024119, 9 pages.

Liu et al. "A blockchain-based framework of cross-border e-commerce supply chain", Dec. 24, 2019, International Journal of Information Management, vol. 52, pp. 1-18 (Year: 2019) (Abstract).

Non-Final Office Action received in U.S. Appl. No. 17/155,428 dated Dec. 17, 2021.

Office Action (Non-Final Rejection) dated May 25, 2023 for U.S. Appl. No. 17/155,428 (pp. 1-18).

Office Action (Final Rejection) dated Jul. 11, 2023 for U.S. Appl. No. 17/212,382 (pp. 1-15).

\* cited by examiner

METHODS AND SYSTEMS FOR EXECUTING AND EVALUATING SANDBOXED FINANCIAL SERVICES TECHNOLOGY SOLUTIONS WITHIN A REGULATORY APPROVAL PROCESS

CROSS-REFERENCE TO RELATED APPLICATIONS

This application claims priority from U.S. Provisional Patent Application No. 62/966,184, filed on Jan. 27, 2020, entitled "Methods and Systems for Executing and Evaluating Sandboxed Financial Services Technology Solutions Within a Regulatory Approval Process," which is hereby incorporated by reference.

BACKGROUND

This disclosure relates to execution and evaluation of products within regulatory approval processes. More particularly, the methods and systems described herein relate to functionality for executing and evaluating sandboxed financial services technology solutions within a regulatory approval process.

Financial market regulators (i.e., central banks) around the world are struggling to keep up with the pace of innovation. This dynamic has weakened the central banks' ability to effectively manage systemic risks and consumer protection in the market.

There is a need for technical tools that enable regulators to not only review applications for regulation of new technology but also to execute and regulate financial services technology products in a vetted, transparent manner.

BRIEF DESCRIPTION

In one aspect, a method for executing and evaluating financial services technology solutions in a secured testing environment during a regulatory approval process includes receiving, by a first computing device, via a user interface, a regulatory process application from a second computing device. The method includes receiving, by the first computing device, via the user interface, from the second computing device, an application programming interface (API) call providing an instruction for use in executing, within a secured testing environment, a software application identified within the regulatory process application. The method includes executing, by the first computing device, the software application within the secured testing environment. The method includes providing, by the first computing device, access to the software application executing within the secured testing environment to a user of a third computing device, during at least one phase of a regulatory approval process. The method includes receiving, by the first computing device from the third computing device, a result of the at least one phase of the regulatory approval process. The method includes displaying, by the first computing device, via the user interface, to the second computing device, the received result.

In another aspect, a method for executing and evaluating financial services technology solutions in a secured live environment during a regulatory approval process includes receiving, by a first computing device, via a user interface, a regulatory process application from a second computing device. The method includes receiving, by the first computing device, via the user interface, from the second computing device, an application programming interface (API) call providing an instruction for use in executing, within a secured live environment, a software application identified within the regulatory process application. The method includes executing, by the first computing device, the software application within the secured live environment. The method includes providing, by the first computing device, access to the software application executing within the secured live environment to a user of a third computing device, during at least one phase of a regulatory approval process. The method includes receiving, by the first computing device from the third computing device, a result of the at least one phase of the regulatory approval process. The method includes displaying, by the first computing device, via the user interface, to the second computing device, the received result.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality executed to provide a turnkey solution for reviewing applications for regulatory approval of financial services technology products in a vetted, transparent manner. The methods and systems described herein may include an online platform that provides functionality for automating and streamlining execution and evaluation of sandboxed financial services technology products during a regulatory approval process. As an example, and without limitation, the methods and systems described herein may provide functionality for managing aspects of a regulatory approval process, including submission, pre-configured test templates, smart testing features, encrypted code review, an Application Programming Interface (API) Gateway to at least one payment system, smart risk assessment, review and approval, data retention, and/or approval confirmations. The methods and systems described herein may provide financial technology user interfaces for users submitting applications. The methods and systems described herein may provide regulator user interfaces for users reviewing submitted applications. The methods and systems described herein may, in some embodiments, use a blockchain base to track application progress. The methods and systems described herein may, in some embodiments, use a blockchain base to secure submitted program code. Financial technology solutions, products, and/or software applications may be developed, maintained, and/or provided by a bank or by a financial technology solution provider (also referred to herein as a "fintech").

A sandbox is a secured testing environment with which a computing device may execute code in a protected environment (e.g., isolated from other portions of the computing device or from a production environment); execution of computer code in such an environment mitigates failures or vulnerabilities as a result of flaws or insecurities within the computer code. A "regulatory sandbox" may refer to a process by which a regulator reviews a technology solution (e.g., executes the technology in addition to reviewing documentation provided with an application for review) for the purpose of assessing risks posed by the solution to consumers and to banks, compliance with regulatory requirements, and licensing requirements to be completed prior to launch of the solution; if a technology solution is approved for use, the regulator may relax or waive regulations that would otherwise apply to the solution. Sandboxes may allow a central bank to establish regulatory clarity for innovation, to communicate country and/or regional technological needs to solution providers, and to standardize an end-to-end regulatory review process. Sandboxes may be designed by jurisdiction (e.g., domestic coverage or regional coverage to provide one review for a group of countries). Sandboxes may be designed by industry (e.g., finance/payments, trade, governance, healthcare, climate change). Sandboxes may be designed by ecosystem (e.g., regulators (owners), service providers, and other third parties). In one embodiment, by using the methods and systems described herein, a central bank may deploy an automated process that simplifies the qualitative and technical review of new financial technology solutions while gaining clarity and understanding of any market risks to the central bank from the use of the new solutions.

Although there are systems available for using sandboxes in regulatory processes, such conventional systems do not typically leverage blockchain technology to track submitted product code or to allow for additional testing of the product during and after regulatory processes.

The methods and systems provided herein may provide functionality for creating accounts, submitting application data (including, for example, solution submission forms and questionnaire templates), regulatory review (including both non-technical review and technical review, such as API testing and production and test networks), test result documentation and retention of those documents, and rejection/approval processes.

Figure 1A:
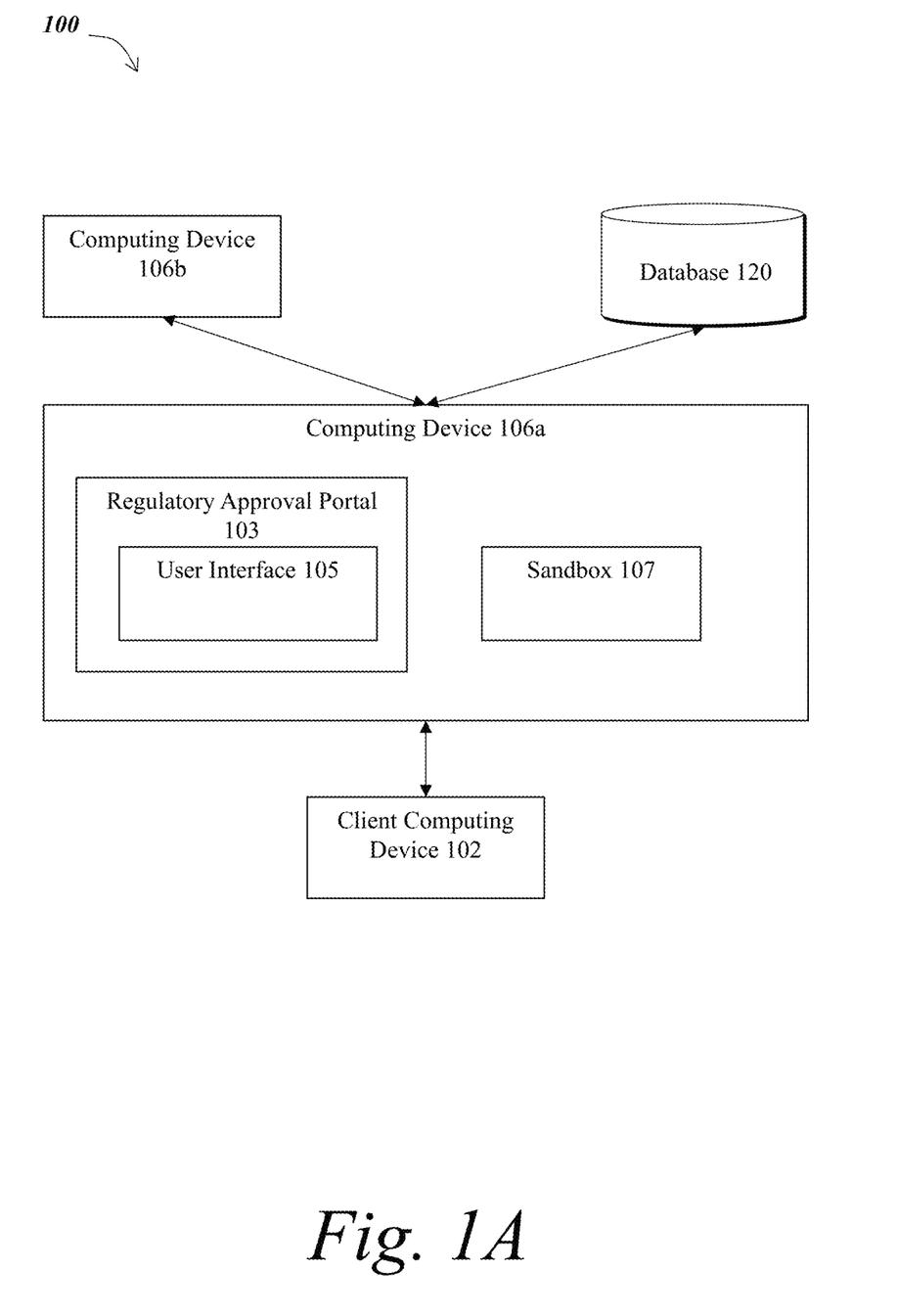
FIG. 1A is a block diagram depicting an embodiment of a system for executing and evaluating sandboxed financial services technology solutions within a regulatory approval process.

Referring now to FIG. 1A, and in brief overview, a system 100 includes a computing device 106a, a computing device 106b, a client computing device 102, a regulatory approval portal 103, a user interface 105, a sandbox 107, and a database 120. The computing devices 106a, 106b, and 102 may be a modified type or form of computing device (as described in greater detail below in connection with FIGS. 3A-C) that have been modified to execute instructions for providing the functionality described herein; these modifications result in a new type of computing device that provides a technical solution to problems rooted in computer technology, such as how to execute pre-approval computer code in a secure manner during a regulatory approval process.

Referring now to FIG. 1A in greater detail, the regulatory approval portal 103 may be provided as a software component. The regulatory approval portal 103 may be provided as a hardware component. The computing device 106a may execute the regulatory approval portal 103. The regulatory approval portal 103 may generate the user interface 105 for display by the client computing device 102 (e.g., the regulatory approval portal 103 may provide the functionality of a web server). The regulatory approval portal 103 may provide an interface to the sandbox 107. In one embodiment, the regulatory approval portal 103 may be hosted on an environment maintained by a central bank. In one embodiment, the regulatory approval portal 103 may be hosted on an environment maintained by an entity providing services to central banks and regulatory agencies (e.g., hosted on a cloud with access provided to authorized users associated with central banks and/or regulatory agencies).

The sandbox 107 may be provided as a software component. The sandbox 107 may be provided as a hardware component. The computing device 106a may execute the regulatory approval portal 103. The regulatory approval portal 103 may generate the user interface 105 for display by the client computing device 102 (e.g., the regulatory approval portal 103 may provide the functionality of a web server). The regulatory approval portal 103 may provide an interface to the sandbox 107.

The regulatory approval portal 103 may include or be in communication with the database 120. The database 120 may store data related to one or more phases of a regulatory approval process. For example, the database 120 may store data related to one or more applications requesting regulatory approval. The database 120 is an ODBC-compliant database. For example, the database 120 may be provided as an ORACLE database, manufactured by Oracle Corporation of Redwood Shores, Calif. In other embodiments, the database 120 can be a Microsoft ACCESS database or a Microsoft SQL server database, manufactured by Microsoft Corporation of Redmond, Wash. In other embodiments, the database 120 can be a SQLite database distributed by Hwaci of Charlotte, N.C., or a PostgreSQL database distributed by The PostgreSQL Global Development Group. In still other embodiments, the database 120 may be a custom-designed database based on an open source database, such as the MYSQL family of freely available database products distributed by Oracle Corporation of Redwood City, Calif. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc., of New York, N.Y., an AWS DynamoDB distributed by Amazon Web Services and Cassandra databases distributed by The Apache Software Foundation of Forest Hill, Md. In further embodiments, the database 120 may be any form or type of database.

Figure 1B:
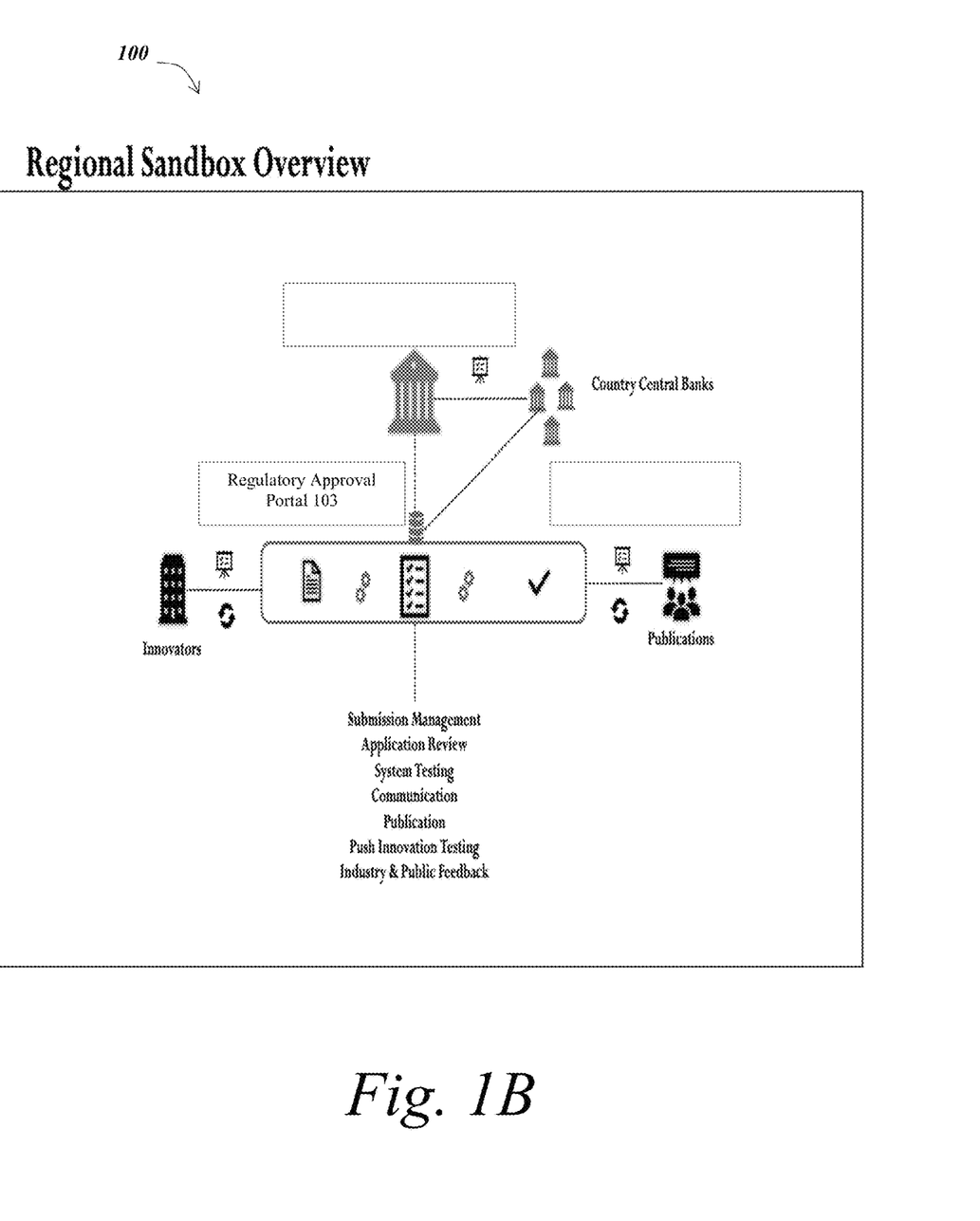
FIG. 1B is a block diagram depicting an embodiment of a system for executing and evaluating sandboxed financial services technology solutions within a regulatory approval process.

Referring now to FIG. 1B, a block diagram depicts an embodiment of a system for executing and evaluating sandboxed financial services technology solutions within a regulatory approval process. As shown in FIG. 1B, the regulatory approval portal 103 may provide functionality for managing application submissions, application review, system testing, communication (e.g., with regulators), publication, push innovation testing, and industry and public feedback. The system 100 may include functionality for publishing data generated by the system 100. As shown in FIG. 1B, the sandbox may allow users to submit an application for regulatory approval to a regulatory agency responsible for a region including a plurality of countries; each country may receive the results of the regulatory agency review of a submitted application and corresponding computer code and use the results in making country-specific regulatory decisions.

Figure 1C:
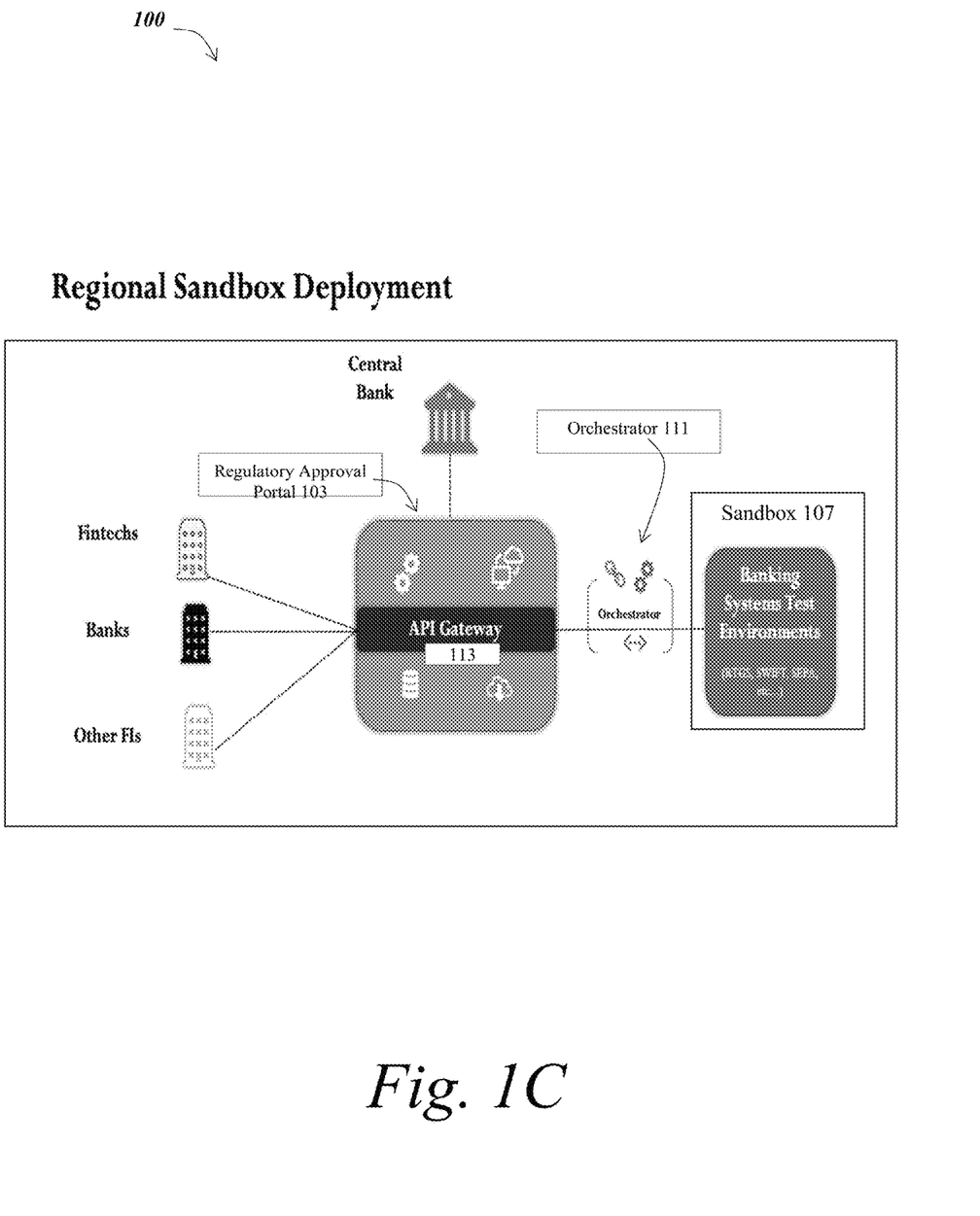
FIG. 1C is a block diagram depicting an embodiment of a system for executing and evaluating sandboxed financial services technology solutions within a regulatory approval process.

Referring now to FIG. 1C, a block diagram depicts an embodiment of a system for executing and evaluating sandboxed financial services technology solutions within a regulatory approval process. As shown in FIG. 1C, the system 100 may include an orchestrator in providing functionality between an application programming interface (API) gateway 113 of the regulatory approval portal 103 and the sandbox 107. As will be understood by those of skill in the art, an API is a computing interface that defines interactions between multiple software processes, defining types of requests that can be made by one software process of another, how to make the requests, the data formats that should be used in making requests, and so on. As shown in FIG. 1C, a technology solution provider (e.g., financial technology companies, banks, and other financial institutions) may access the API gateway 113 (e.g., via the regulatory approval portal 103). As shown in FIG. 1C, a central bank may access the regulatory approval portal 103, including the API gateway 113, to conduct a regulatory review of a financial technology solution provided by a technology solution provider. In some embodiments, the system 100 includes functionality allowing a regulatory agency to provide APIs wrapped into standard interfaces for Fintechs and banks or other established financial institutions to get rate-limited access to data flows, such as real time financial transaction reporting, payments settlement, identity verification and compliance reporting. By providing and implementing the API gateway 113, the methods and systems described herein provide functionality for standardization of how financial technology solutions connect with a regulatory sandbox 107. Integration of such an "API Marketplace" makes available a plurality of APIs for use in connecting technology solutions into a regulatory platform and process. Such integration provides a novel and non-obvious technical solution to the problem of providing computer programs (e.g., the financial technology solutions) with standardized tools for accessing and providing access to sandbox testing environments; that is, by standardizing the APIs available for installing and/or executing a computer program within a sandbox testing environment, the methods and systems described herein provide integration tools for standardizing how multiple types of financial services tools can technologically be installed in and execute within sandbox testing environment and what functionality is made available to different types of users based on user type or role (e.g., the functionality may provide regulators with different features than the functionality provides to financial technology solution providers). Conventional approaches to regulating financial technology solutions does not typically allow for an entity such as a regulatory agency to provide a plurality of APIs that any entity seeking to be regulated, such as a financial services technology provider, may use to make a financial services technology solution available for execution within a secured environment while also providing functionality for users associated with the regulatory agency (e.g., regulators) to use as part of a regulatory approval process. Furthermore, although described primarily as functionality for executing technology within a secured testing environment, such functionality may also allow for executing technology within secured, live environments.

Figure 1D:
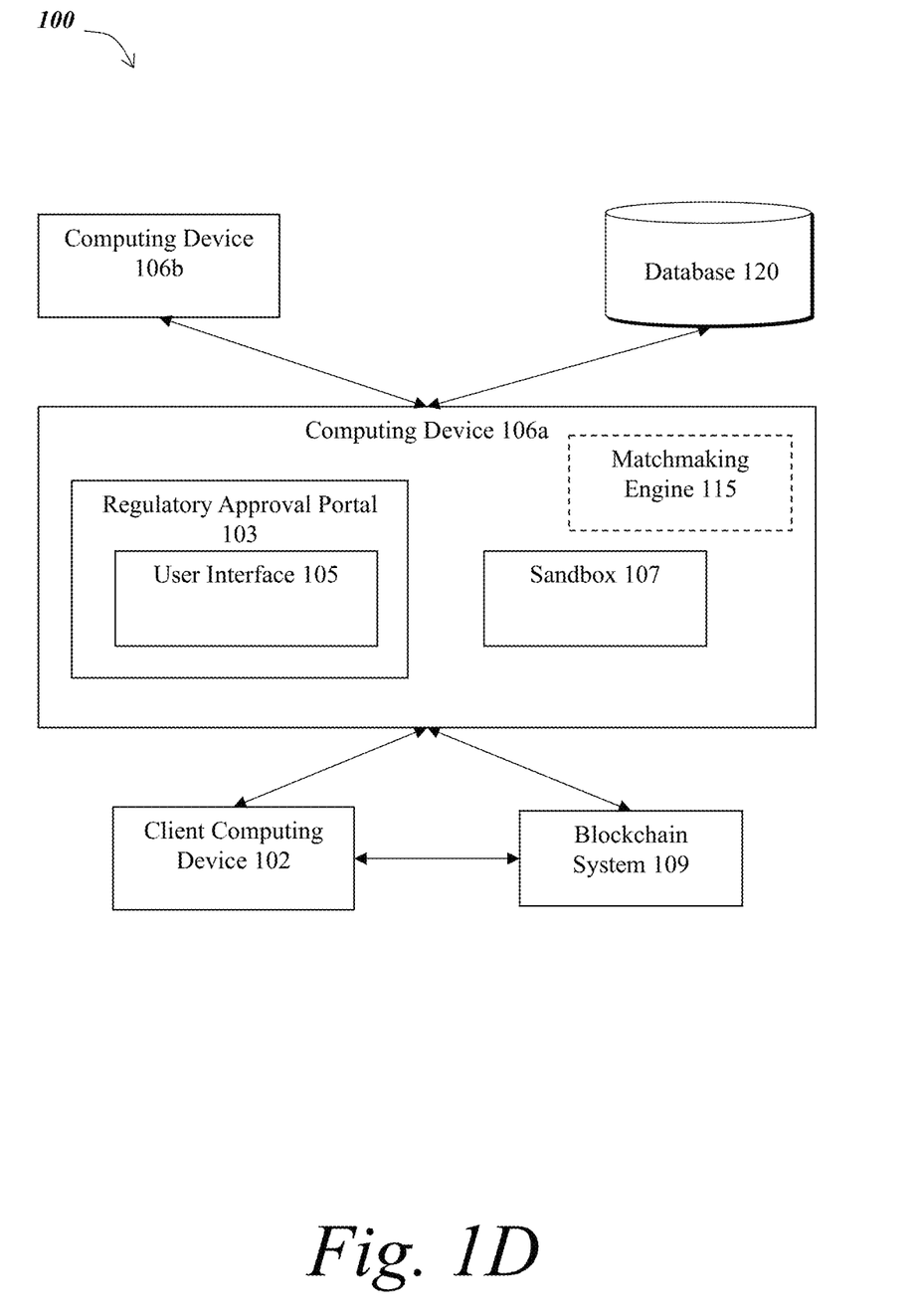
FIG. 1D is a block diagram depicting an embodiment of a system for executing and evaluating sandboxed financial services technology solutions within a regulatory approval process.

Referring now to FIG. 1D, a block diagram depicts an embodiment of a system for executing and evaluating sandboxed financial services technology solutions within a regulatory approval process, the system including a blockchain system 109. The blockchain system 109 may be provided by an entity providing the system 100. The blockchain system 109 may be provided by a third party, with the entity providing the system 100 also providing its users with access to the blockchain system 109. The blockchain system 109 may include a plurality of computing devices 106 (not shown). As will be understood by those of ordinary skill in the art, a blockchain provides an immutable ledger of data without relying on oversight by a central authority. In some embodiments of a blockchain, digital assets are tracked in a shared public ledger so that all transactions involving those digital assets can be independently verified. A blockchain can provide a type of digital escrow arrangement. Therefore, the first computing device 106 and the client computing device 102 may each provide functionality for writing to blocks in a blockchain and for querying a blockchain. The first computing device 106 may provide one or more application programming interfaces (APIs) and services as will be described in further detail below. The database 120 may store data related to execution of code that is stored in the blockchain system 109 and executed within the sandbox 107.

Continuing with the description of FIG. 1D, the system 100 may include a matchmaking engine 115. In some embodiments, when a financial technology solution provider uses the methods and systems described herein, the financial technology solution provider is added to a database of users (e.g., as part of the database 120 or in a second such database), which may include an identification of other private companies (e.g., fintechs and banks) as well as registered professional service providers, and/or country or regional regulatory agencies (e.g., central banks). In some of these embodiments, the database 120 also includes an identification of one or more financial technology products that users also registered with the system 100. In such embodiments, the methods and systems described herein provide functionality providing registered users (including users associated with entities such as the fintechs, banks, services providers, and regulatory agencies that are included in the database) with access to a searchable database of technical service providers and integration tools and a matchmaking engine in the system 100 (not shown) that would allow fintechs, based on their maturity, size, type and budgets to search for and identify tools and services with which to integrate. The methods described herein, therefore, may including searching, by a first user associated with a first entity, for a service provider, for other entities, and/or for products with which the first entity's products may integrate and/or compete. The methods described herein, therefore, may also include functionality allowing companies to test integration tools in secured testing environments—for example, to assess the functionality of an integration between a third party tool and a tool provided by a financial technology solution provider. The methods described herein may include functionality allowing companies to launch their own products in conjunction with integration tools provided by third parties in secured live environments. The methods described herein may include functionality allowing companies to access integration tools to connect their application(s) to third party services or to consume third party services. The methods described herein may include functionality allowing entities to use the searchable database to access a marketplace of professional service providers (i.e., Deloitte, KPMG, etc.) and the matchmaking engine that would allow fintechs and banks, based on their maturity, size, type and budgets to meet the right professional services firms to ramp up their business activities quickly.

The system 100 may include functionality allowing for management of time and resources allocated to a regulatory review process.

Although, for ease of discussion, the regulatory approval portal 103, the user interface 105, the sandbox 107, and the database 120 are described in FIG. 1A-1D as separate modules, it should be understood that this does not restrict the architecture to a particular implementation. For instance, these components may be encompassed by a single circuit or software function or, alternatively, distributed across a plurality of computing devices.

Figure 2A:
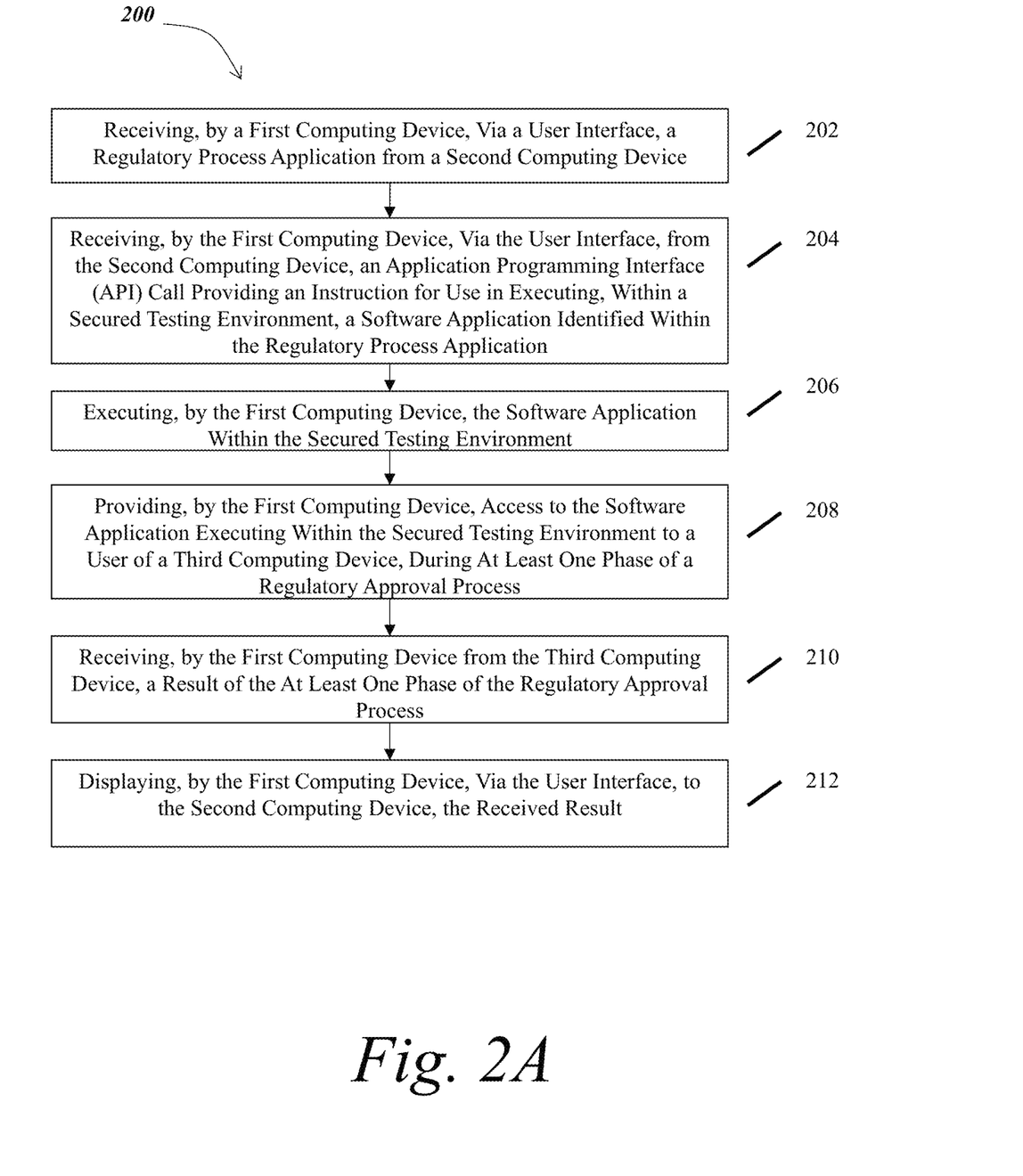
FIG. 2A is a flow diagram depicting an embodiment of a method for executing and evaluating sandboxed financial services technology solutions within a regulatory approval process.

Referring now to FIG. 2A, in brief overview, a flow diagram depicts one embodiment of a method 200 for executing and evaluating financial services technology solutions in a secured testing environment during a regulatory approval process. The method 200 includes receiving, by a first computing device, via a user interface, from a second computing device, a regulatory process application from a second computing device (202). The method 200 includes receiving, by the first computing device, via the user interface, from the second computing device, an application programming interface (API) call providing an instruction for use in executing, within a secured testing environment, a software application identified within the regulatory process application (204). The method 200 includes executing, by the first computing device, the software application within the secured testing environment (206). The method 200 includes providing, by the first computing device, access to the software application executing within the secured testing environment to a user of a third computing device, during at least one phase of a regulatory approval process (208). The method 200 includes receiving, by the first computing device from the third computing device, a result of the at least one phase of the regulatory approval process (210). The method 200 includes displaying, by the first computing device, via the user interface, to the second computing device, the received result (212).

Referring now to FIG. 2A, in greater detail and in connection with FIGS. 1A-1D, the method 200 includes receiving, by a first computing device, via a user interface, from a second computing device, a regulatory process application from a second computing device (202). In one embodiment, the second computing device 102 is associated with a financial technology solution provider. The second computing device 102 uploads documentation for use in reviewing computer code in a technology solution and documentation related to an application for regulatory approval to use the technology solution. The regulatory process application may include an identification of at least one software application for which the financial technology solution provider requests regulatory approval. The regulatory process application may include an identification of at least one software application that the financial technology solution provider plans to execute within the secured testing environment to comply with one or more requirements of the regulatory process application. The system 100 may include functionality allowing for private companies (i.e., fintech or bank) to complete automated workflows based on requirements from a regulatory agency.

The method 200 includes receiving, by the first computing device, via the user interface, from the second computing device, an application programming interface (API) call providing an instruction for use in executing, within a secured testing environment, a software application identified within the regulatory process application (204). The financial technology solution provider may transmit one or more such instructions to enable the installation and execution of the software application within the secured testing environment. The API gateway 113 may make one or more features available to the financial technology solution provider that are different than one or more features available to a user performing one or more phases of a regulatory approval process. For example, the API gateway 113 may limit the ability of the financial technology solution provider to access or modify the software application once one or more phases of the regulatory approval process have begun. As another example, the API gateway 113 may provide regulatory users with the ability to access and modify documents relating to a regulatory approval process that are not available to the financial technology solution provider (e.g., online forms for completion as part of the regulatory approval process).

The method 200 includes executing, by the first computing device, the software application within the secured testing environment (206). The regulatory approval portal 103 may receive, via the API gateway 113, one or more instructions for executing the software application within the secured testing environment. The regulatory approval portal 103 may transmit the received one or more instructions to the secured testing environment provided by the sandbox 107. The API gateway 113 may transmit the received one or more instructions to the orchestrator 111, which in turn transmits the instructions to the sandbox 107 for processing. In some embodiments, the orchestrator 111 may apply one or more processes for translating the API instruction received from the second computing device via the API gateway 113 into an instruction that the secured testing environment of the sandbox 107 can execute, which may include converting the API instruction from one format or computer language into another.

The method 200 includes providing, by the first computing device, access to the software application executing within the secured testing environment to a user of a third computing device, during at least one phase of a regulatory approval process (208). The regulatory approval portal 103 may provide a plurality of users within a regulatory agency with access to the software application. For example, the regulatory agency may include different departments, each of which is testing a different aspect of the software application for different regulatory purposes, and users from each of the different departments may require access to the sandbox, which the regulatory approval portal 103 may provide for the users. As indicated above, the regulatory approval portal 103 and the API gateway 113 may make one or more features available to the financial technology solution provider that are different than one or more features available to a user performing one or more phases of a regulatory approval process, providing customized access for regulators and for financial technology solution providers.

The method 200 includes receiving, by the first computing device from the third computing device, a result of the at least one phase of the regulatory approval process (210). The result may indicate that additional testing is required before approval will be granted. The result may indicate that additional features are required before approval will be granted. The result may indicate that a portion of the regulatory approval process is successfully completed. The result may indicate that the entirety of the regulatory approval process is successfully completed.

The method 200 includes displaying, by the first computing device, via the user interface, to the second computing device, the received result (212). The first computing device 106a may provide this information directly or indirectly; for example, the regulatory approval portal 103 may direct the display of the received result within the user interface generated by the second computing device (e.g., by providing the functionality of a web server) or transmit the information to the second computing device by a method other than a direct display (e.g., by transmitting a message, such as an email, or providing a uniform resource locator with which a user of the second computing device may access the result). The method may include displaying a risk evaluation assessment of a financial services technology solution generated by application of an analytical rule to one or more features of the financial services technology solution during a regulatory approval process. Therefore, the method 200 may include communicating, by a regulatory agency, a result of a regulatory review to the requesting private company (e.g., a fintech or bank). The method 200 may include confirming, by the regulatory agency, a result of a regulatory review to the requesting private company (e.g., a fintech or bank). The method 200 may include transmitting, by a regulatory agency, a status of a regulatory review to the requesting private company (e.g., a fintech or bank).

The method 200 may include providing, by the first computing device, to the second computing device, access to functionality for generating one or more benchmarks of the performance of one or more features of the software application. The system 100 may provide functionality allowing a user of the second computing device to review one or more digested results via the user interface prior to transmission of the results to the regulatory agency.

The first computing device 106a may transmit, to a fourth computing device, the received result, wherein the first computing device is associated with a regulatory agency for a country and wherein the fourth computing device is associated with a central bank of the country.

The first computing device 106a may transmit, to a fourth computing device, the received result, wherein the first computing device is associated with a regulatory agency for a region and wherein the fourth computing device is associated with a central bank of a country in the region. In this way, the company seeking regulatory approval for the technology solution may apply to a single regional regulatory agency and receive decisions on regulatory approval from a plurality of central banks (e.g., from a central bank in each country in the region) without having to apply to each central bank separately. The fourth computing device may be associated with a central bank of a country in the region associated with the regulatory agency.

As indicated above, the methods and systems described herein provide functionality allowing a regulatory agency (i.e., central bank) to receive regulatory review requests from private company (i.e., fintech or bank) and provide functionality allowing a regulatory agency (i.e., central bank) to assess information provided via a user interface by the private company. The methods and systems described herein may also provide functionality for receiving, by a first computing device associated with a first regulatory agency, a regulatory review request from a second regulatory agency or a central bank. The methods and systems described herein may provide functionality allowing users to generate and transmit regulatory review requests from a first regulatory agency or central bank to a second regulatory agency or a central bank. The methods and systems described herein may provide functionality allowing for communication among country or regional regulatory agencies regarding a status or completion of a requested regulatory review.

Figure 2B:
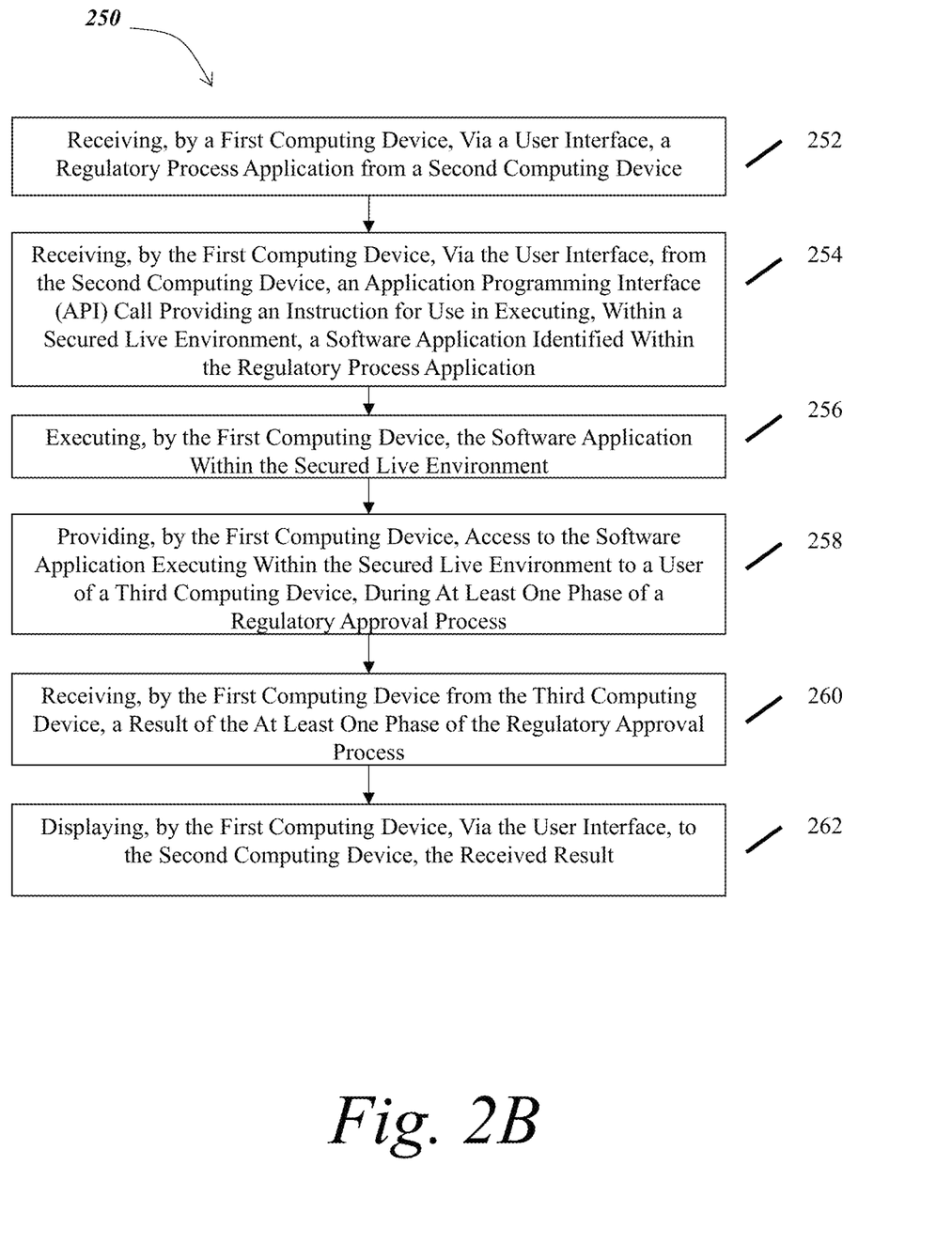
FIG. 2B is a flow diagram depicting an embodiment of a method for executing and evaluating sandboxed financial services technology solutions within a regulatory approval process.

As indicated above, the method of 2A may be executed when the sandbox environment is not a testing environment but a live environment, or when the sandbox environment is both a testing environment and a live environment. Referring now to FIG. 2B, therefore, in brief overview, a flow diagram depicts one embodiment of a method 250 for executing and evaluating financial services technology solutions in a secured live environment. The method 250 includes receiving, by a first computing device, via a user interface, from a second computing device, a regulatory process application from a second computing device (252). The method 250 includes receiving, by the first computing device, via the user interface, from the second computing device, an application programming interface (API) call providing an instruction for use in executing, within a secured live environment, a software application identified within the regulatory process application (254). The method 250 includes executing, by the first computing device, the software application within the secured live environment (256). The method 250 includes providing, by the first computing device, access to the software application executing within the secured live environment to a user of a third computing device, during at least one phase of a regulatory approval process (258). The method 250 includes receiving, by the first computing device from the third computing device, a result of the at least one phase of the regulatory approval process (260). The method 250 includes displaying, by the first computing device, via the user interface, to the second computing device, the received result (262). The steps (252) through (262) may be executed as described above in connection with FIG. 2A, although the sandbox 107 provides the functionality of a secured live environment.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIGS. 1A-1C and 2.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 3A:
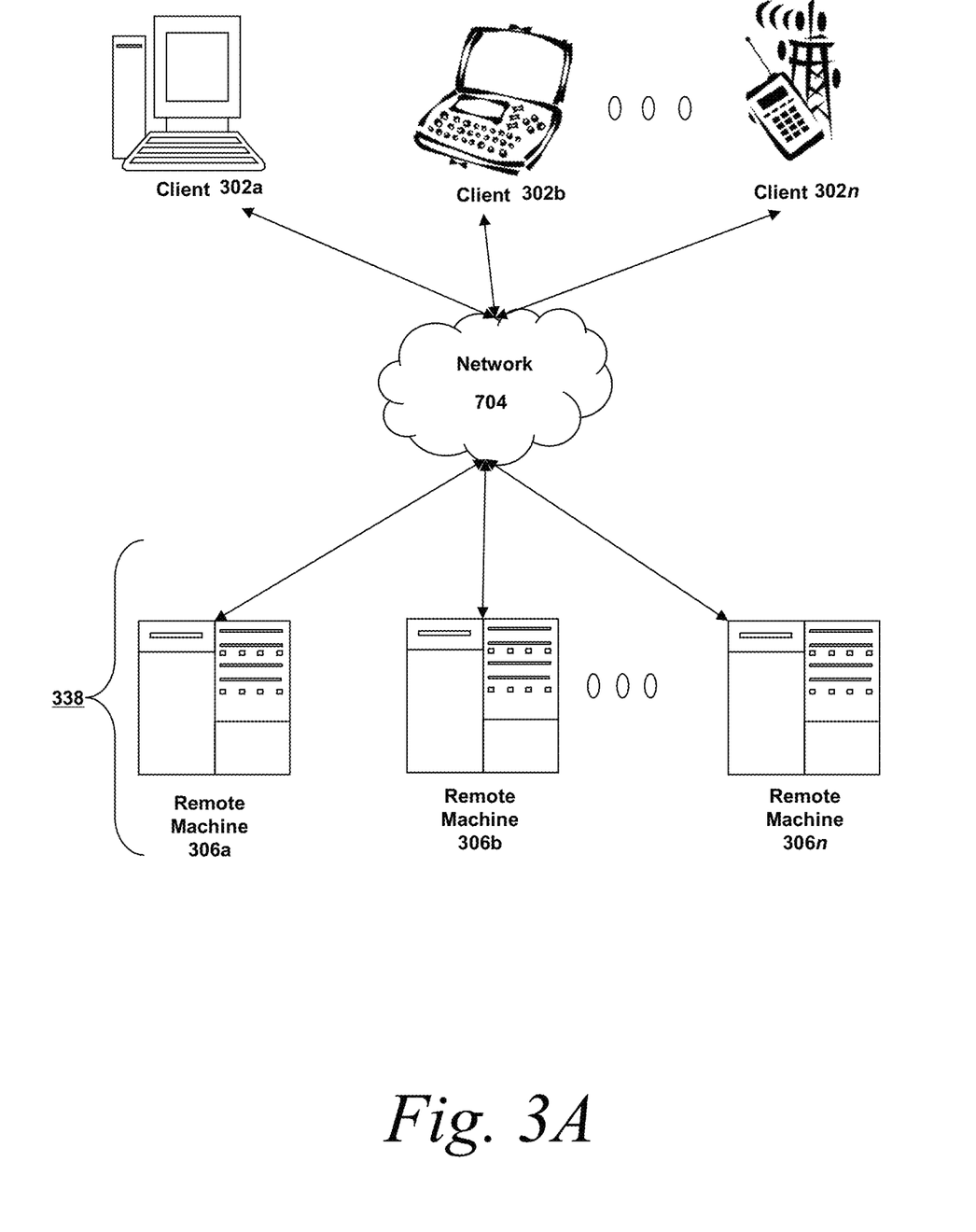
FIGS. 3A-3C are block diagrams depicting embodiments of computers useful in connection with the methods and systems described herein.
Figure 3B:
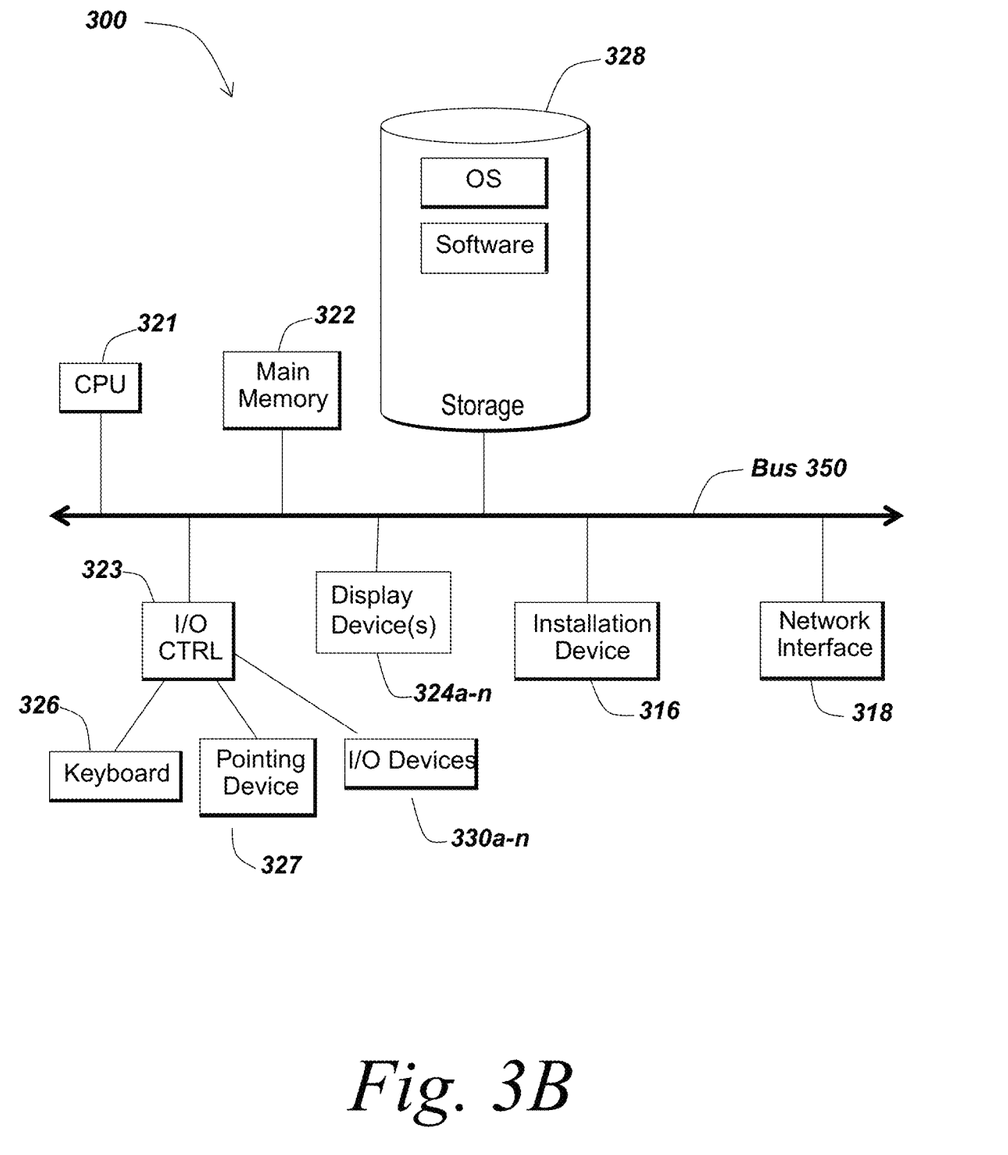
Figure 3C:
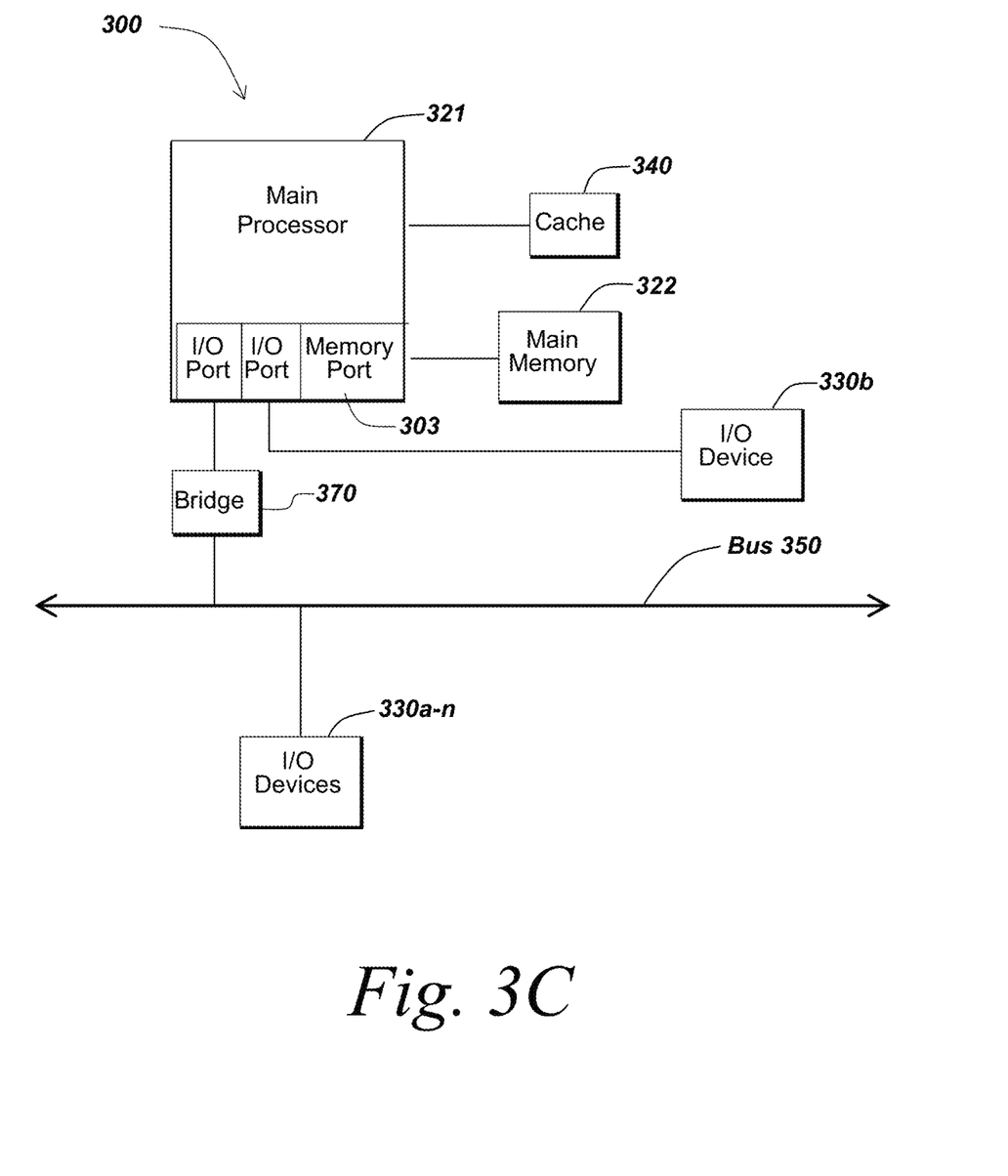

Referring now to FIGS. 3A, 3B, and 3C, block diagrams depict additional detail regarding computing devices that may be modified to execute novel, non-obvious functionality for implementing the methods and systems described above.

Referring now to FIG. 3A, an embodiment of a network environment is depicted. In brief overview, the network environment comprises one or more clients 302a-302n (also generally referred to as local machine(s) 302, client(s) 302, client node(s) 302, client machine(s) 302, client computer(s) 302, client device(s) 302, computing device(s) 302, endpoint(s) 302, or endpoint node(s) 302) in communication with one or more remote machines 306a-306n (also generally referred to as server(s) 306 or computing device(s) 306) via one or more networks 304.

Although FIG. 3A shows a network 304 between the clients 302 and the remote machines 306, the clients 302 and the remote machines 306 may be on the same network 304. The network 304 can be a local area network (LAN), such as a company Intranet, a metropolitan area network (MAN), or a wide area network (WAN), such as the Internet or the World Wide Web. In some embodiments, there are multiple networks 304 between the clients 302 and the remote machines 306. In one of these embodiments, a network 304' (not shown) may be a private network and a network 304 may be a public network. In another of these embodiments, a network 304 may be a private network and a network 304' a public network. In still another embodiment, networks 304 and 304' may both be private networks. In yet another embodiment, networks 304 and 304' may both be public networks.

The network 304 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 304 may comprise a wireless link, such as an infrared channel or satellite band. The topology of the network 304 may be a bus, star, or ring network topology. The network 304 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 302 and a remote machine 306 (referred to generally as computing devices 300) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 302 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 302.

In one embodiment, a computing device 306 provides functionality of a web server. In some embodiments, a web server 306 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the ORACLE WEB-LOGIC products provided by Oracle Corporation of Redwood Shores, Calif.

In some embodiments, the system may include multiple, logically-grouped remote machines 306. In one of these embodiments, the logical group of remote machines may be referred to as a server farm 338. In another of these embodiments, the server farm 338 may be administered as a single entity.

FIGS. 3B and 3C depict block diagrams of a computing device 300 useful for practicing an embodiment of the client 302 or a remote machine 306. As shown in FIGS. 3B and 3C, each computing device 300 includes a central processing unit 321, and a main memory unit 322. As shown in FIG. 3B, a computing device 300 may include a storage device 328, an installation device 316, a network interface 318, an I/O controller 323, display devices 324a-n, a keyboard 326, a pointing device 327, such as a mouse, and one or more other I/O devices 330a-n. The storage device 328 may include, without limitation, an operating system and software. As shown in FIG. 3C, each computing device 300 may also include additional optional elements, such as a memory port 303, a bridge 370, one or more input/output devices 330a-n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 300 may be based on any of these processors, or any other processor capable of operating as described herein.

Main memory unit 322 may be one or more memory chips capable of storing data and allowing any storage location to be directly accessed by the main processor 321. The main memory 322 may be based on any available memory chips capable of operating as described herein. In the embodiment shown in FIG. 3B, the processor 321 communicates with main memory 322 via a system bus 350. FIG. 3C depicts an embodiment of a computing device 300 in which the processor communicates directly with main memory 322 via a memory port 303. FIG. 3C also depicts an embodiment in which the main processor 321 communicates directly with cache memory 340 via a secondary bus, sometimes referred to as a backside bus. In other embodiments, the main processor 321 communicates with cache memory 340 using the system bus 350.

In the embodiment shown in FIG. 3B, the processor 321 communicates with various I/O devices 330 via a local system bus 350. Various buses may be used to connect the central processing unit 321 to any of the I/O devices 330, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 324, the processor 321 may use an Advanced Graphics Port (AGP) to communicate with the display 324. FIG. 3C depicts an embodiment of a computing device 300 in which the main processor 321 also communicates directly with an I/O device 330b via, for example, HYPERTRANSPORT, RAPIDIO, or INFINIBAND communications technology.

One or more of a wide variety of I/O devices 330a-n may be present in or connected to the computing device 300, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 323 as shown in FIG. 3B. Furthermore, an I/O device may also provide storage and/or an installation device 316 for the computing device 300. In some embodiments, the computing device 300 may provide USB connections (not shown) to receive handheld USB storage devices such as the USB Flash Drive line of devices manufactured by Twintech Industry, Inc. of Los Alamitos, Calif.

Referring still to FIG. 3B, the computing device 300 may support any suitable installation device 316, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 300 may provide functionality for installing software over a network 304. The computing device 300 may further comprise a storage device, such as one or more hard disk drives or redundant arrays of independent disks, for storing an operating system and other software. Alternatively, the computing device 300 may rely on memory chips for storage instead of hard disks.

Furthermore, the computing device 300 may include a network interface 318 to interface to the network 304 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 300 communicates with other computing devices 300' via any type and/or form of gateway or tunneling protocol such as Secure Socket Layer (SSL) or Transport Layer Security (TLS). The network interface 318 may comprise a built-in network adapter, network interface card, PCMCIA network card, card bus network adapter, wireless network adapter, USB network adapter, modem, or any other device suitable for interfacing the computing device 300 to any type of network capable of communication and performing the operations described herein.

In further embodiments, an I/O device 330 may be a bridge between the system bus 350 and an external communication bus, such as a USB bus, an Apple Desktop Bus, an RS-232 serial connection, a SCSI bus, a FireWire bus, a FireWire Boo bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 300 of the sort depicted in FIGS. 3B and 3C typically operates under the control of operating systems, which control scheduling of tasks and access to system resources. The computing device 300 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, and WINDOWS VISTA, WINDOWS 10 all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc., of Raleigh, N.C.; Ubuntu, a freely-available operating system distributed by Canonical Ltd. of London, England; or any type and/or form of a Unix operating system, among others.

Having described certain embodiments of methods and systems for executing and evaluating sandboxed financial services technology solutions within a regulatory approval process, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for executing and evaluating financial services technology solutions in a secured testing environment during a regulatory approval process, the method including:
   receiving, by a first computing device, via a user interface, a regulatory process application from a second computing device;
   receiving, by the first computing device, via the user interface, from the second computing device, an application programming interface (API) call providing an instruction for use in executing, within a secured testing environment, a software application identified within the regulatory process application;
   executing, by the first computing device, the software application within the secured testing environment;
   providing, by the first computing device, access to the software application executing within the secured testing environment to a user of a third computing device, during at least one phase of a regulatory approval process;
   receiving, by the first computing device from the third computing device, a result of the at least one phase of the regulatory approval process; and
   displaying, by the first computing device, via the user interface, to the second computing device, the received result.

2. The method of claim 1, further comprising transmitting, by the first computing device, to a fourth computing device, the received result, wherein the first computing device is associated with a regulatory agency for a region and wherein the fourth computing device is associated with a central bank of a country in the region.

3. The method of claim 1, further comprising transmitting, by the first computing device, to a fourth computing device, the received result, wherein the first computing device is associated with a regulatory agency for a country and wherein the fourth computing device is associated with a central bank of the country.

4. The method of claim 1, wherein executing the software application within the secured testing environment further comprises:
   receiving, by an orchestrator module executing on the first computing device, to the secured testing environment, the API call; and
   transmitting, by the orchestrator module, to the secured testing environment, the API call.

5. A method for executing and evaluating financial services technology solutions in a secured live environment during a regulatory approval process, the method including:
   receiving, by a first computing device, via a user interface, a regulatory process application from a second computing device;
   receiving, by the first computing device, via the user interface, from the second computing device, an application programming interface (API) call providing an instruction for use in executing, within a secured live environment, a software application identified within the regulatory process application;
   executing, by the first computing device, the software application within the secured live environment;
   providing, by the first computing device, access to the software application executing within the secured live environment to a user of a third computing device, during at least one phase of a regulatory approval process;
   receiving, by the first computing device from the third computing device, a result of the at least one phase of the regulatory approval process; and
   displaying, by the first computing device, via the user interface, to the second computing device, the received result.

6. The method of claim 5, further comprising transmitting, by the first computing device, to a fourth computing device, the received result, wherein the first computing device is associated with a regulatory agency for a region and wherein the fourth computing device is associated with a central bank of a country in the region.

7. The method of claim 5, further comprising transmitting, by the first computing device, to a fourth computing device, the received result, wherein the first computing device is associated with a regulatory agency for a country and wherein the fourth computing device is associated with a central bank of the country.

8. The method of claim 5, wherein executing the software application within the secured live environment further comprises:
   receiving, by an orchestrator module executing on the first computing device, to the secured live environment, the API call; and
   transmitting, by the orchestrator module, to the secured live environment, the API call.

\* \* \* \* \*